(12) United States Patent
Sawada

(10) Patent No.: US 8,488,463 B2
(45) Date of Patent: Jul. 16, 2013

(54) WIRELESS COMMUNICATION APPARATUS, METHOD FOR CONTROLLING THE SAME, AND PROGRAM THEREFOR

(75) Inventor: Tetsuya Sawada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1346 days.

(21) Appl. No.: 11/435,440

(22) Filed: May 17, 2006

(65) Prior Publication Data

US 2006/0280151 A1    Dec. 14, 2006

(30) Foreign Application Priority Data

Jun. 10, 2005 (JP) ................................ 2005-171661

(51) Int. Cl.
*H04J 1/16* (2006.01)

(52) U.S. Cl.
USPC ........ 370/235; 370/230.1; 370/329; 370/465; 455/452.2; 455/266; 455/522

(58) Field of Classification Search
USPC .... 370/329, 338, 235, 230.1, 465; 455/452.2, 455/266, 522
See application file for complete search history.

(56) References Cited

U.S. PATENT DOCUMENTS

| | | | | |
|---|---|---|---|---|
| 6,097,733 A | * | 8/2000 | Basu et al. | 370/468 |
| 6,122,289 A | * | 9/2000 | Brown et al. | 370/465 |
| 6,388,999 B1 | * | 5/2002 | Gorsuch et al. | 370/335 |
| 2002/0163929 A1 | * | 11/2002 | Li et al. | 370/448 |
| 2002/0191559 A1 | * | 12/2002 | Chen et al. | 370/329 |
| 2003/0212787 A1 | * | 11/2003 | Qiu et al. | 709/224 |
| 2004/0023661 A1 | * | 2/2004 | Pi et al. | 455/450 |
| 2004/0062273 A1 | * | 4/2004 | Frank et al. | 370/468 |
| 2005/0036448 A1 | * | 2/2005 | Leeuwen | 370/235 |

FOREIGN PATENT DOCUMENTS

| | | | |
|---|---|---|---|
| JP | 10-242981 A | | 9/1998 |
| JP | 11-261642 A | | 9/1999 |
| JP | 2002-111728 A | | 4/2002 |
| JP | 2002-354000 A | | 12/2002 |
| JP | 2004-158965 A | | 6/2004 |
| WO | WO 2004/012493 | * | 2/2004 |

* cited by examiner

*Primary Examiner* — Manpreet Matharu

(74) *Attorney, Agent, or Firm* — Canon U.S.A., Inc. IP Division

(57) ABSTRACT

A method for controlling a wireless communication apparatus includes request processing for requesting information regarding traffic to an access point, measurement processing for performing data transmission and reception wirelessly on the basis of the information regarding traffic requested by the request processing and measuring traffic during the data transmission and reception, and re-request processing for updating the information regarding traffic to be requested to the access point so as to correspond to the traffic measured by the measurement processing and re-requesting the updated information.

16 Claims, 18 Drawing Sheets

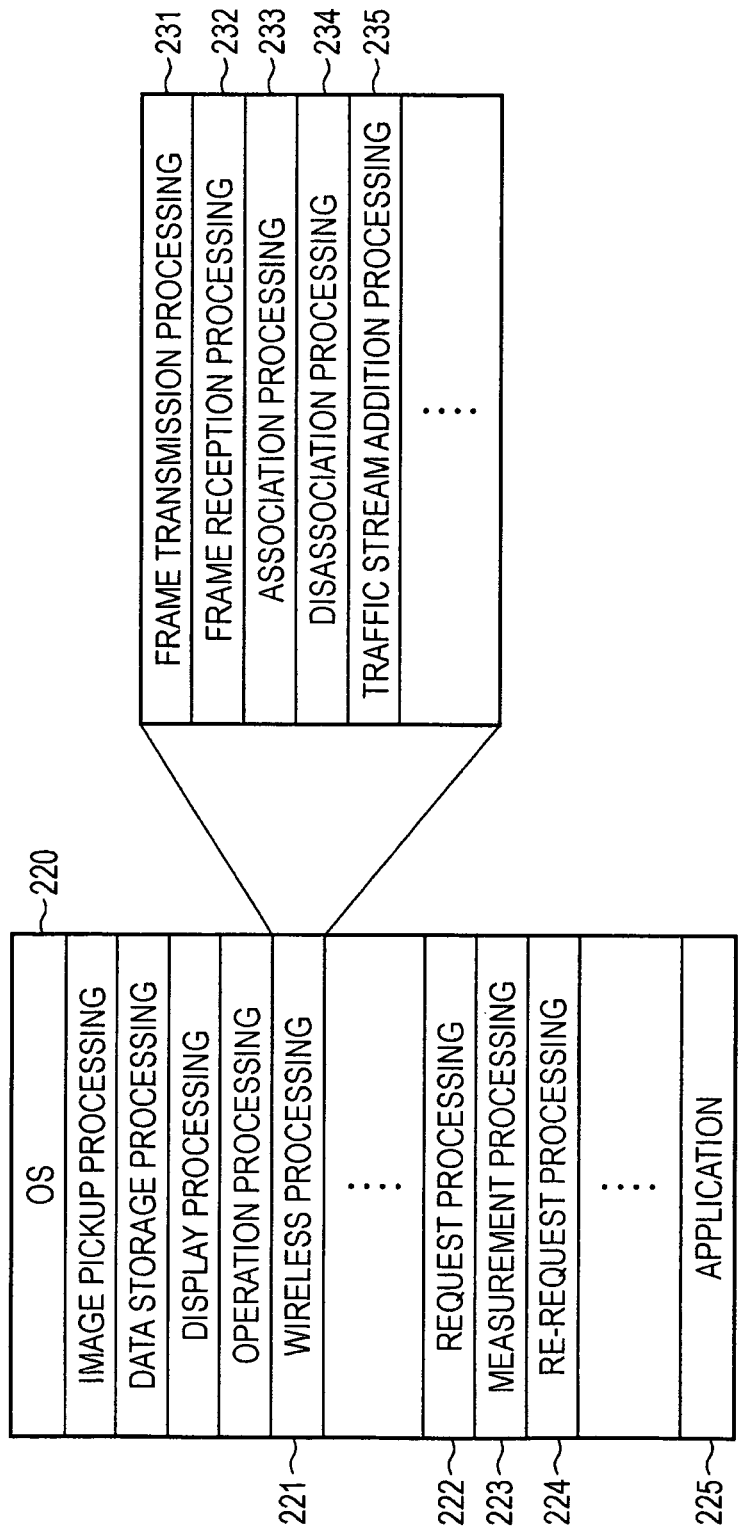

FIG. 4

| VIDEO STREAMING TSPEC | |
|---|---|
| Direction | Uplink |
| Access Policy | HCCA |
| User Priority | 5 |
| Nominal MSDU Size | 1024 octets |
| Maximum MSDU Size | 1024 octets |
| Mean Data Rate | 630 kbps |
| Peak Data Rate | 1.5 Mbps |
| Burst Size | 14894 octets |
| Delay Bound | 60 ms |
| Minimum PHY Rate | 24 Mbps |

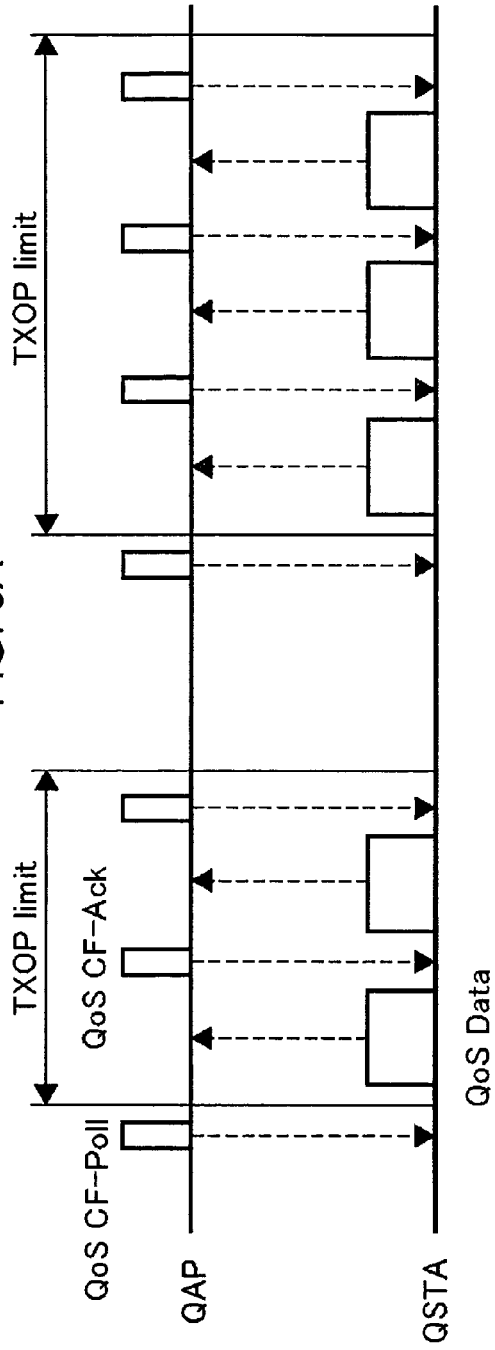
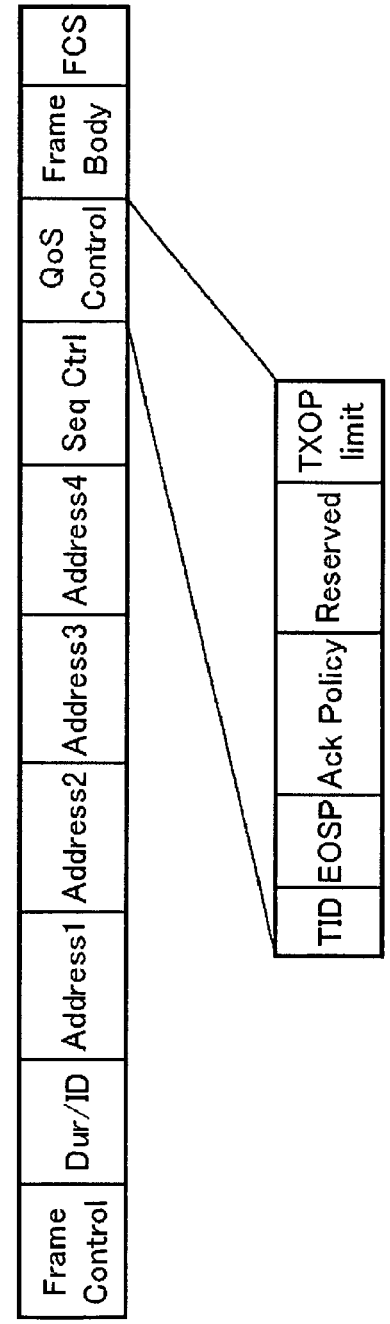
FIG. 5A
FIG. 5B

FIG. 8

| VIDEO STREAMING TSPEC | |
|---|---|
| Direction | Uplink |
| Access Policy | HCCA |
| User Priority | 5 |
| Nominal MSDU Size | 1024 octets |
| Maximum MSDU Size | 1024 octets |
| Mean Data Rate | 315 kbps |
| Peak Data Rate | 1.5 Mbps |
| Burst Size | 14894 octets |
| Delay Bound | 60 ms |
| Minimum PHY Rate | 24 Mbps |

FIG. 11

| VIDEO STREAMING TSPEC ||
|---|---|
| Direction | Uplink |
| Access Policy | EDCA |
| User Priority | 5 |
| Nominal MSDU Size | 1024 octets |
| Maximum MSDU Size | 1024 octets |
| Mean Data Rate | 630 kbps |
| Peak Data Rate | 1.5 Mbps |
| Burst Size | 14894 octets |
| Delay Bound | 60 ms |
| Minimum PHY Rate | 24 Mbps |

FIG. 15

| VIDEO STREAMING TSPEC | |
|---|---|
| Direction | Uplink |
| Access Policy | EDCA |
| User Priority | 6 |
| Nominal MSDU Size | 1024 octets |
| Maximum MSDU Size | 1024 octets |
| Mean Data Rate | 630 kbps |
| Peak Data Rate | 1.5 Mbps |
| Burst Size | 14894 octets |
| Delay Bound | 60 ms |
| Minimum PHY Rate | 24 Mbps |

WIRELESS COMMUNICATION APPARATUS, METHOD FOR CONTROLLING THE SAME, AND PROGRAM THEREFOR

BACKGROUND OF THE INVENTION

1. Field of the Invention

The present invention relates to a wireless communication apparatus that performs data communications with an access point and to a method for controlling the wireless communication apparatus and a program therefor.

2. Description of the Related Art

Generally, a wireless local area network (LAN) system includes an access point (hereinafter referred to as AP in IEEE 802.11 and QAP in IEEE 802.11e) and a number of wireless terminals (hereinafter referred to as STAs in IEEE 802.11 and QSTAs in IEEE 802.11e). A LAN may be coupled between the access point and each of the wireless terminals by using a wireless medium (e.g., radio waves). An access point functions as a bridge or router and also communicates with a wired LAN. A wireless terminal can communicate with another wireless terminal and wired terminals participating in a wired LAN via an access point.

IEEE 802.11, a standard for a wireless LAN, defines two access control methods for providing and/or controlling access to a wireless medium between APs and STAs in the function of the Medium Access Control (MAC) layer. One is the Distributed Coordination Function (DCF), which is of a distributed control type, and the other is the Point Coordination Function (PCF), which is of a centralized control type.

Distributed-control-type DCF performs access control by using Carrier Sense Multiple Access with Collision Avoidance (CSMA/CA). CSMA/CA has an advantage that APs and STAs can transmit a packet in an autonomous and decentralized manner because a wireless terminal that tries to carry out packet transmission starts transmitting after determining that a wireless medium is not used. However, CSMA/CA has a disadvantage that an increase in the number of STAs and in the amount of traffic increases the number of collisions between packets and the number of retransmissions and thereby decreases throughput.

Centralized-control-type PCF performs access control in which an AP collectively controls access from itself and each STA to a wireless medium. Because only an STA that is polled by the AP is permitted to transmit, this lowers the degree of flexibility in transmission timing. However, collisions may not occur between packets and thus retransmission may not be necessary. Therefore, PCF may be more suitable for data transmission that requires real-time processing.

An AP can use DCF access control and PCF access control alternately and periodically. When the AP uses PCF, the AP must indicate an access control period for use in the PCF to each STA by using a management frame and control frame (e.g., beacon frame and Contention-Free End (CF-End) frame). This period is called the Contention Free Period (CFP), and during the CFP, each STA does not transmit a packet until the STA is polled by the AP.

In the IEEE 802.11 standard mentioned above, a variety of parameters in the DCF and PCF and the essential operations to be performed by the AP and STA are defined, but details of control and applications are dependent on implementations, so specifics are not defined. On the basis of this background, several techniques concerning these two types of access control have been proposed.

One such technique is disclosed in Japanese Patent Laid-Open No. 2004-158965. In a wireless LAN system that has a PCF described in this patent document, an STA sends, to an AP, a subsequent request bandwidth corresponding to the transfer amount of transmission data that is to be subsequently requested, together with the current transmission data. This technique aims to efficiently perform data transmission by dynamically controlling a bandwidth for each data transmission.

As a recent standard trend, Task Group E (TGe) is discussing a standard that includes a mechanism performing a prioritization and a bandwidth reservation depending on the contents or use of data to support the Quality of Service (QoS) and is defining such a standard as IEEE 802.11e.

In IEEE 802.11e, there are two methods of access control: the compulsory Enhanced Distributed Channel Access (EDCA) and the optional HCF, Hybrid Coordination Function, Controlled Channel Access (HCCA).

EDCA is of a distributed-control-type method, like the conventional DCF, but is enhanced so as to be able to perform prioritization with respect to access to a wireless medium depending on the type of data. In EDCA, audio data or other data, which requires real-time processing, can preferentially access a wireless medium.

HCCA is of a centralized control type method, like the conventional PCF, but, in addition to the prioritization, HCCA is designed such that efficient bandwidth reservations corresponding to the transmission conditions can be realized by exchanging necessary transmission conditions in advance between a QAP and a QSTA. In the conventional PCF, a period for which an AP can poll a wireless terminal is limited to a CFP. In contrast, for the HCCA, if a QAP detects a certain idle time in the wireless medium, the QAP can obtain access at any time, transmit data, and poll another QSTA.

The conventional wireless terminals described above are designed to perform efficient data transmission by allowing necessary transmission conditions to be exchanged in advance between a wireless terminal and an AP and thus allowing an appropriate bandwidth to be reserved by the AP. However, depending on the difference in interpretative methods between the wireless terminal and the AP or the state of radio waves, a problem arises in which too much or too little bandwidth may be reserved.

Additionally, the conventional wireless terminals are designed to perform efficient data transmission by allowing necessary transmission conditions to be exchanged in advance between a wireless terminal and an AP and thus allowing appropriate prioritization to be performed by the AP. However, depending on the difference in interpretative methods between the wireless terminal and the AP or the state of accommodating other wireless terminals, another problem arises in which too high or too low a priority may be assigned.

SUMMARY OF THE INVENTION

Embodiments of the present invention provide wireless data transmission that corresponds to traffic.

According to a first aspect of the present invention, a wireless communication apparatus includes a request unit configured to request information regarding traffic to an access point, a communication unit configured to perform data communication wirelessly on the basis of the information regarding traffic requested by the request unit, a measurement unit configured to measure traffic during the data communication performed by the communication unit, and an update unit configured to update the information regarding traffic to be requested to the access point so as to correspond to the traffic measured by the measurement unit.

According to a second aspect of the present invention, a method for controlling a wireless communication apparatus includes requesting information regarding traffic to an access point, performing data communication wirelessly on the basis of the information regarding traffic, measuring traffic during the data communication, and updating the information regarding traffic to be requested to the access point so as to correspond to the traffic measured during the data communication.

According to a third aspect of the present invention, a machine-readable medium having stored thereon instructions which, when executed by a wireless communication apparatus, causes the wireless communication apparatus to perform a method including: requesting information regarding traffic to an access point, performing data communication wirelessly on the basis of the information regarding traffic, measuring traffic during the data communication, and updating the information regarding traffic to be requested to the access point so as to correspond to the traffic measured during the data communication.

According to a fourth aspect of the present invention, a system includes an access point device and a wireless device. The wireless device is operable to perform wireless data communication with the access point device and measure traffic during the data communication. The wireless device is configured to request the access point to reserve a defined bandwidth based on the traffic measured during the data communication.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2B illustrates a configuration of programs stored in a program storage unit in the digital video camera.

FIG. 4 illustrates an example of a default traffic specification element stored in a digital video camera according to an exemplary embodiment.

FIGS. 5A and 5B are illustrations for explaining the general outlines of a polling operation in HCCA. FIG. 5A illustrates a state in which a QAP transmits a QoS CF-Poll frame to a QSTA, the QSTA receives the frame and performs data transmission within a period of time (TXOP limit) indicated in the QoS CF-Poll frame. FIG. 5B illustrates a frame structure of the QoS CF-Poll frame.

FIG. 8 illustrates a traffic specification element for re-request according to the first exemplary embodiment.

FIG. 11 illustrates an example of a default traffic specification element according to a second exemplary embodiment.

FIG. 15 illustrates an example of a traffic specification element for re-request according to the second exemplary embodiment.

DESCRIPTION OF THE EMBODIMENTS

Exemplary embodiments are described below with reference to the drawings. The present invention is not limited by the exemplary embodiments. In addition, not all combinations of the characteristics described in the exemplary embodiments are required to means for solving the problems.

First Exemplary Embodiment

The first exemplary embodiment is described below with reference to FIGS. 1 to 10.

Figure 1:
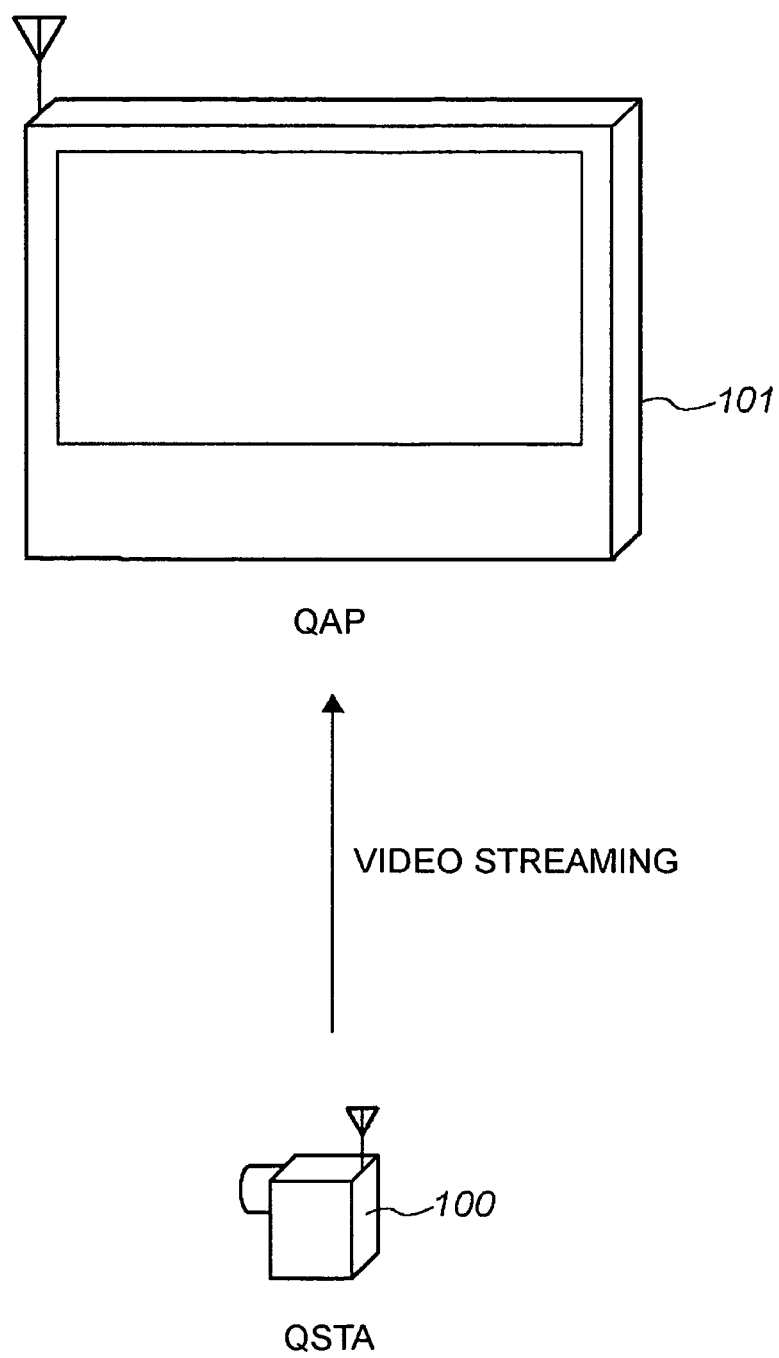
FIG. 1 illustrates a wireless system that includes a wireless terminal (QSTA) according to an exemplary embodiment and an access point (QAP) capable of accommodating the wireless terminal.

FIG. 1 illustrates a wireless system that includes a wireless terminal (QSTA) 100 and an access point (QAP) 101.

The QSTA 100 can be accommodated in the access point QAP, participate in a network, and perform data communication. The QSTA 100 and QAP 101 can perform wireless communication in accordance with the IEEE 802.11a standard as the physical layer. In addition, the QSTA 100 and QAP 101 can perform wireless communication (including the optional HCCA) in accordance with the IEEE 802.11 and 802.11e standards as the MAC layer. Although the QSTA 100 is a digital video camera and the QAP 101 is a display in this exemplary embodiment, the present invention is not limited to this. This embodiment shows a case in which the digital video camera (QSTA) 100 performs video streaming on the display (QAP) 101 in an uplink.

Figure 2A:
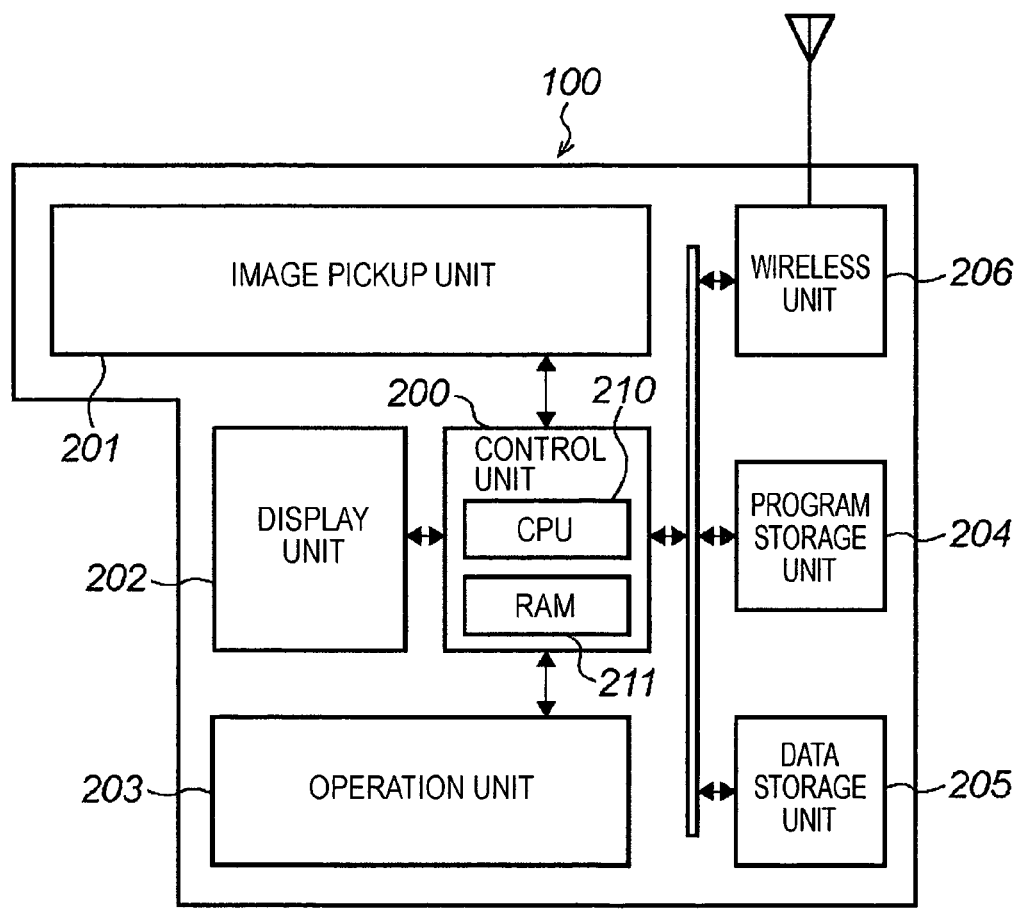
FIG. 2A is a block diagram showing a structure of a digital video camera according to an exemplary embodiment.

FIG. 2A is a block diagram showing a structure of the digital video camera 100 (which is a wireless terminal QSTA according to the first exemplary embodiment). FIG. 2B illustrates a configuration of programs stored in a program storage unit of the digital video camera 100.

In FIG. 2A, a control unit 200 includes a central processing unit (CPU) 210 and a random-access memory (RAM) 211 and controls the overall operation of the digital video camera 100. The CPU 210 controls the overall operation of the digital video camera 100 in accordance with a program stored in a program storage unit 204. An image pickup unit 201 captures an image of a subject and outputs video data. A display unit 202 displays a menu and the video data. An operation unit 203 includes one or more switches and buttons, directly receives an operating instruction from a user, and controls the operation of the digital video camera. A data storage unit 205 stores the video data captured by the image pickup unit 201, various control data, and other data. A wireless unit 206 transmits data to and receives data from the QAP (display) 101 by using the wireless method described above. The RAM 211 stores various data and also functions as a work area that temporarily stores various data (e.g., a variable and a count) during various processing executed by the CPU 210.

Programs shown in FIG. 2B are stored in the program storage unit 204. The programs includes an operating system (OS) 220, which is system software, a plurality of programs that describe control procedure of each unit of the QSTA 100 (image pickup processing, data storage processing, display processing, operation processing, and wireless processing 221), programs described below (request processing 222, measurement processing 223, and re-request processing 224), an application program 225 for video streaming, and the like. As illustrated, the wireless processing 221 includes a plurality of programs for performing frame transmission processing 231, frame reception processing 232, association processing 233, disassociation processing 234, traffic stream addition processing 235, and other processing.

Figures 3A, 3B:
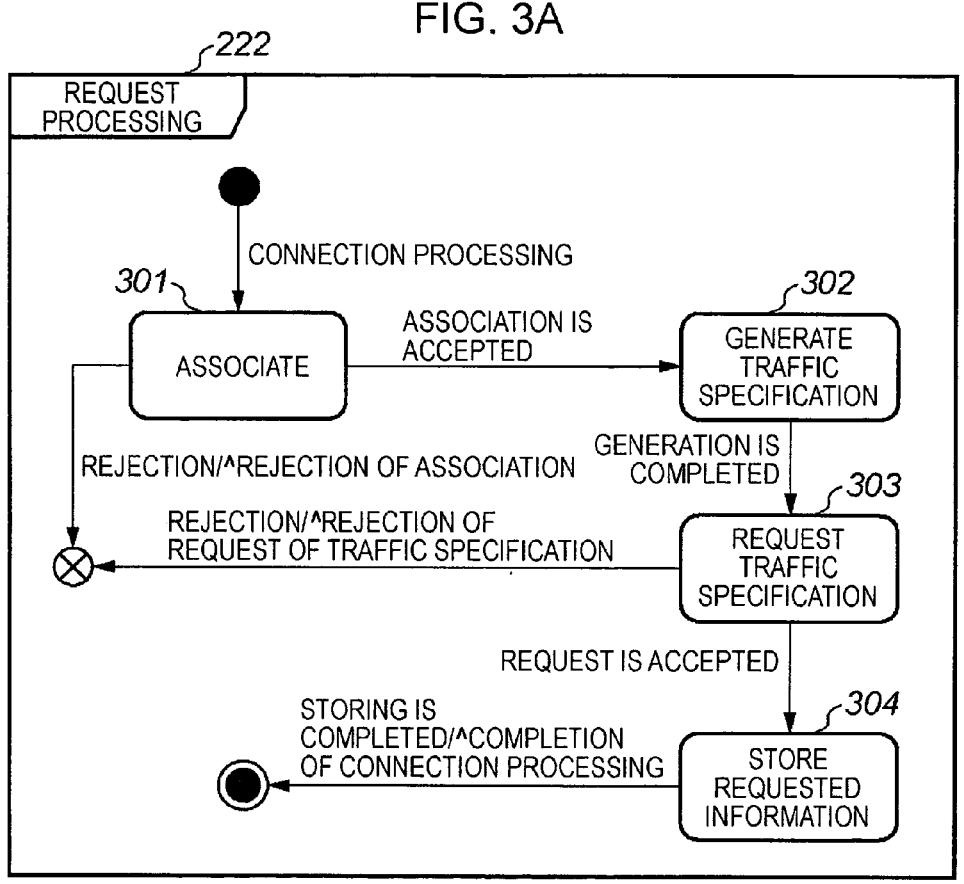
FIG. 3A is a block diagram for explanation of a state machine in request processing according to an exemplary embodiment.
FIG. 3B illustrates a traffic specification element defined in the IEEE 802.11e standard.

FIG. 3A is a block diagram for explanation of a state machine in the request processing 222 according to the first exemplary embodiment. FIG. 3B illustrates a traffic specification element defined in the IEEE 802.11e standard.

The request processing 222 shown in FIG. 3A operates in the digital video camera (QSTA) 100, performs connection processing to the QAP 101, generates a traffic specification element shown in FIG. 3B, and requests information regarding expected traffic to the QAP 101. When the connection processing of the application program 225 which deals with video streaming in the digital video camera 100 is activated, the request processing 222 is activated by the application program 225.

Upon activation, the request processing 222 proceeds to an association state 301. At the association state 301, the connection processing defined in the IEEE 802.11 standard (ASSOCIATE) is performed on the QAP 101 specified by the application program 225.

At this state, the processing calls the association processing 233 in the wireless processing 221 and waits until the association processing 233 returns a result. In the association processing 233, an association request frame is transmitted to the specified QAP 101 via the wireless unit 206. When an association response frame is received from the QAP 101, the result is returned to the request processing 222.

If the association is accepted by the QAP 101, the acceptance of the association is returned, and the request processing 222 proceeds to a traffic specification generating state 302. In contrast, if the association is rejected by the QAP 101, the rejection of the association is returned, and the request processing 222 notifies the application program 225 of the rejection of the association and discontinues the processing.

At the traffic specification generating state 302, the request processing 222 generates a traffic specification element corresponding to traffic expected in video streaming in the video camera performed by the application program 225. At this state, a traffic specification element that has been previously stored in the program storage unit 204, for example, as shown in FIG. 4, is read, and the traffic specification element to be used at the next state is prepared.

FIG. 4 illustrates an example of a default traffic specification element stored in the digital video camera 100 according to the first exemplary embodiment.

When the generation of the traffic specification element is completed, the request processing 222 then proceeds to a traffic specification element requesting state 303. At the traffic specification element requesting state 303, addition of a traffic stream defined in the IEEE 802.11e standard (ADDTS) is performed on the QAP 101 specified by the application program 225. At this state, setup of a traffic stream between QSTA 100 and QAP 101 is performed. At the beginning, the processing calls the traffic stream addition processing 235 in the wireless processing 221 and waits until the traffic stream addition processing 235 returns a result. In the traffic stream addition processing 235, a traffic-stream addition request frame to which the traffic specification element regarding expected traffic is attached is transmitted to the specified QAP 101 via the wireless unit 206. When a traffic-stream addition response frame is received from the QAP 101, the result is returned to the request processing 222.

If the addition of the traffic stream is accepted by the QAP 101, the request processing 222 proceeds to a requested information storing state 304. If the addition of the traffic stream is rejected, the request processing 222 notifies the application program 225 of the rejection of the request of the traffic specification and discontinues the processing. In the requested information storing state 304, the traffic specification element (which is requested information that has been accepted) is stored in the data storage unit 205. When this storing is completed, the request processing 222 ends.

FIGS. 5A and 5B are illustrations for explaining the general outlines of a polling operation.

The display (QAP) 101, which has accepted the addition of the traffic stream from the digital video camera 100 in the way described above, performs a polling operation shown in FIG. 5A.

FIG. 5A illustrates a state in which the QAP 101 transmits a QoS CF-Poll frame to the QSTA 100, the QSTA 100 receives the frame and performs data transmission within a period of time (Transmission Opportunity (TXOP) limit) indicated in the QoS CF-Poll frame. The digital video camera 100 according to the first exemplary embodiment can carry out such a basic operation.

FIG. 5B illustrates a frame structure of the QoS CF-Poll frame.

Figure 6:
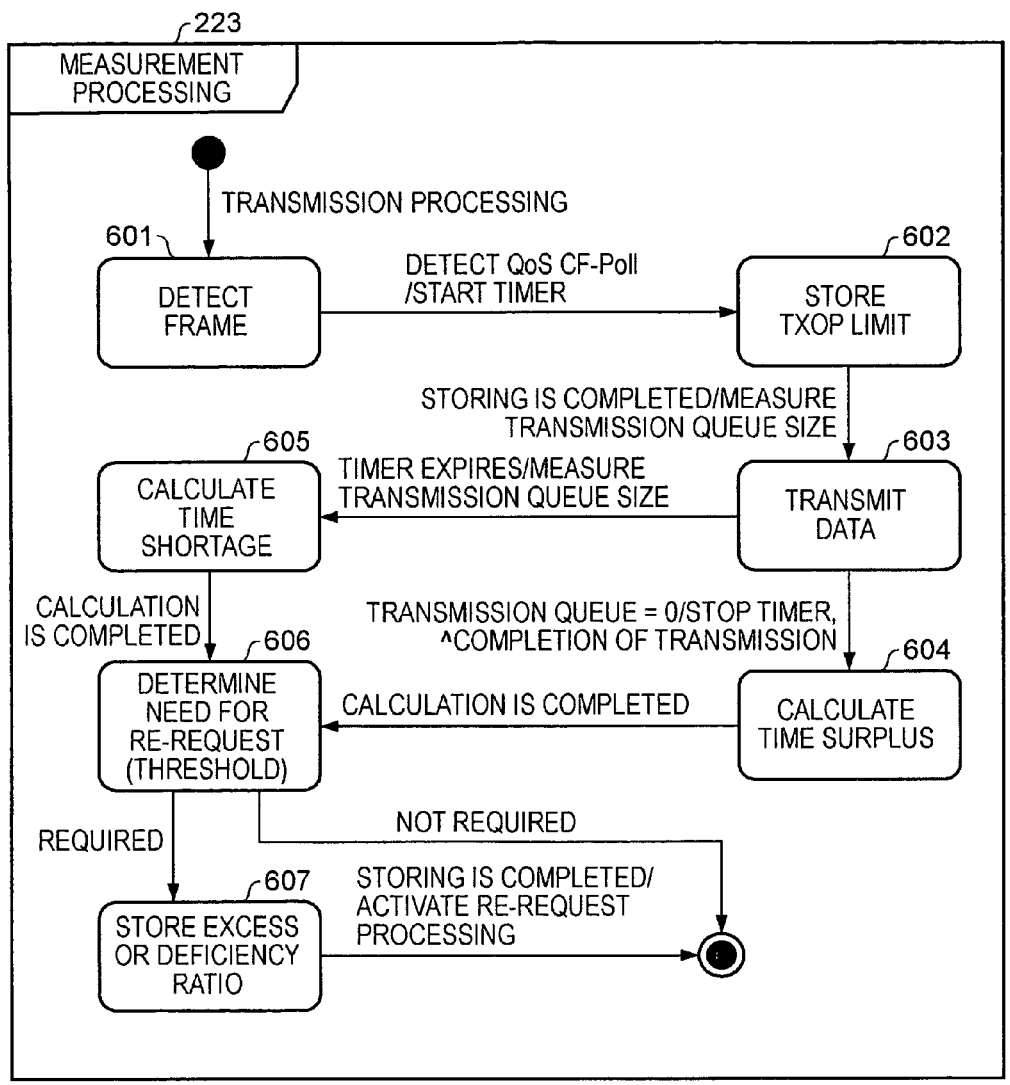
FIG. 6 illustrates a state machine diagram of measurement processing in a digital video camera (QSTA) according to an exemplary embodiment.

FIG. 6 illustrates a state machine diagram of the measurement processing 223 in the digital video camera (QSTA) 100 according to the first exemplary embodiment. The measurement processing 223 operates in the QSTA 100 and performs measurement to determine whether a time (TXOP limit) allocated by the QAP 101, shown in FIG. 5A, is in excess of or insufficient for that required for the actual traffic. When the data transmission processing of the application program 225 which deals with the video streaming in the QSTA 100 is activated, the measurement processing 223 is activated by the application program 225.

Upon activation, the measurement processing 223 proceeds to a frame detecting state 601. At the frame detecting state 601, the measurement processing 223 detects a QoS CF-Poll frame that has been sent from the QAP 101 toward the digital video camera 100. At this state, when the frame reception processing 232 in the wireless processing 221 receives the QoS CF-Poll frame sent toward the digital video camera 100, the frame reception processing 232 notifies the measurement processing 223 of the reception of the QoS CF-Poll frame. When the QoS CF-Poll frame is detected, the measurement processing 223 starts a timer (not shown) to measure a time indicated in the QoS CF-Poll frame (TXOP limit×TU) (msec) and proceeds to a TXOP limit storing state 602. At this state, the measurement processing 223 stores this time (TXOP limit) in the data storage unit 205. After the time is stored, the measurement processing 223 measures the size of a first transmission queue that is the queue before data is transmitted and stores the measured size as control data in the data storage unit 205. Then, the measurement processing 223 proceeds to a data transmitting state 603.

At the data transmitting state 603, the measurement processing 223 performs transmission of a QoS Data frame and reception of a QoS CF-Ack, as shown in FIG. 5B. If the transmission queue becomes zero and the wireless processing 221 notifies the measurement processing 223 of the completion of the data transmission before the timer expires (time-out), i.e., within the time (TXOP limit×TU), the measurement processing 223 stops the time measurement in the timer and proceeds to a time surplus calculating state 604.

In contrast, if the OS 220 notifies the measurement processing 223 of the expiration of the timer (time-out) before the transmission queue becomes zero, the measurement processing 223 measures the size of a second transmission queue that is the queue after the data is transmitted. The measurement processing 223 stores the measured value as control data in the data storage unit 205 and proceeds to a time shortage calculating state 605.

At the time surplus calculating state 604, the measurement processing 223 reads the time (TXOP limit) stored in the data storage unit 205 and calculates the difference to "the time until timer stops/TU". By dividing the allocated time (TXOP limit) by the calculated difference, a ratio of a time surplus supplied to the allocated time (TXOP limit) is obtained. For example, if the transmission queue becomes zero at the end of one half of the allocated time (TXOP limit), the ratio of a time surplus is two. In other words, it shows that the allocated time (TXOP limit) is twice the actual required time. When the time surplus is calculated, the measurement processing 223 proceeds to a re-request determining state 606.

At the time shortage calculating state 605, the measurement processing 223 reads the size of the first transmission queue and that of the second transmission queue stored in the data storage unit 205 and calculates the decrease from the size of the first transmission queue (which is the queue before the data transmission) and that of the second transmission queue (which is the queue after the data transmission). Then, by dividing the calculated decrease by the size of the first transmission queue, a ratio of a time shortage in the time (TXOP limit) is obtained. For example, if the size of the first transmission queue is 100 and the size of the second transmission queue is 20, the ratio of the time shortage is 0.8. In other words, it shows that the allocated time (TXOP limit) is 0.8 times the actual required time. When the time shortage is calculated, the measurement processing 223 proceeds to the re-request determining state 606.

In this exemplary embodiment, the time surplus calculating state 604 and time shortage calculating state 605 performs calculation in accordance with a standard in which the optimal time is a time allocated by a single QoS CF-Poll frame (TXOP limit) that allows the transmission queue to become zero at the end of the time. This standard is used for merely explanation in this exemplary embodiment. For practical applications, different standards corresponding to requirements of various applications may exist.

At the re-request determining state 606 after the calculation of the time surplus or the time shortage is completed, the measurement processing 223 determines by using a threshold whether the re-request processing described below is required or not. For example, if the calculated ratio is between 0.75 and 1.25, the measurement processing 223 determines that no re-request processing is required; otherwise, the measurement processing 223 determines that the re-request processing is required. If the re-request processing is required, the measurement processing 223 stores the calculated ratio in the data storage unit 205 (at a state 607), and activates the re-request processing 224, which is described below. If re-request processing is not required, the measurement processing 223 ends the processing without performing other processes.

As the function of the timer described above, the timer function included in the OS 220 is used. However, a timer incorporated in the CPU 210 or a dedicated timer LSI may be used.

Figure 7:
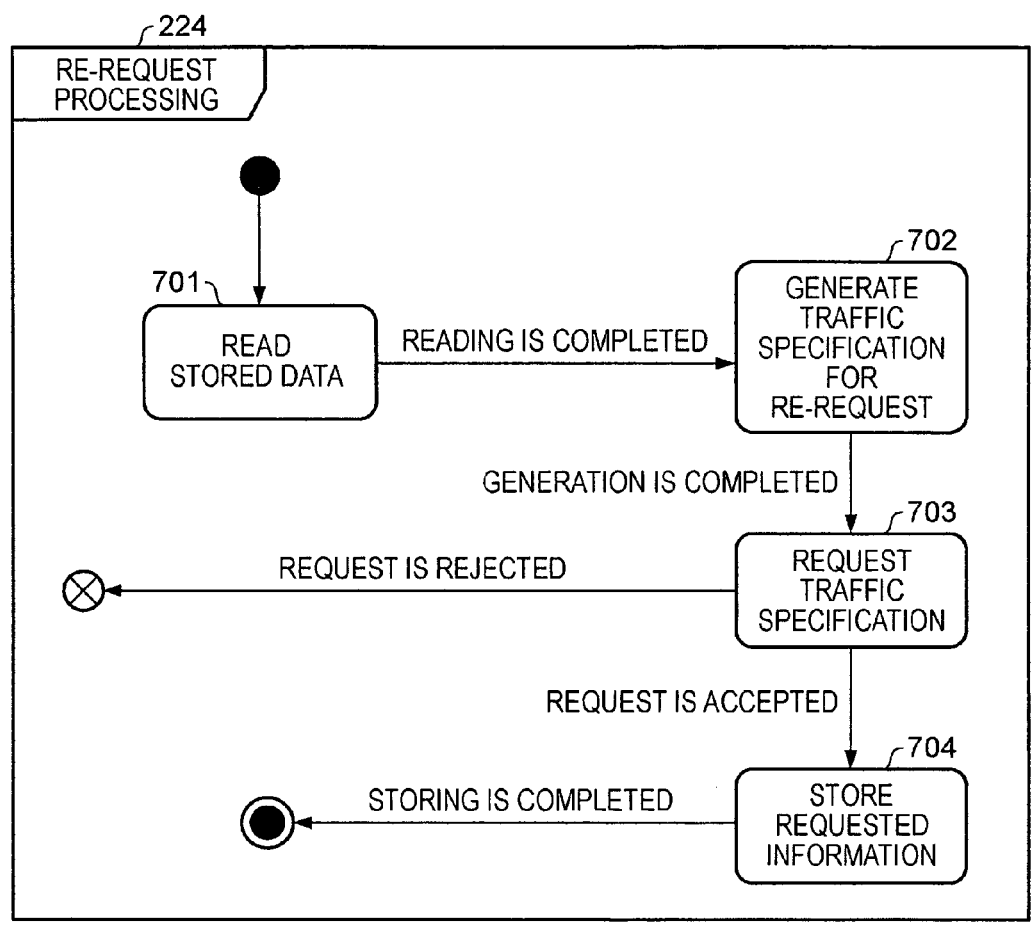
FIG. 7 illustrates a state machine diagram of re-request processing according to a first exemplary embodiment.

FIG. 7 illustrates a state machine diagram of the re-request processing 224 according to the first exemplary embodiment. The re-request processing 224 operates in the digital video camera (QSTA) 100 and requests information regarding the actual traffic. The re-request processing 224 is activated by the measurement processing 223 described above.

Upon activation, the re-request processing 224 proceeds to a storage data reading state 701. At the storage data reading state 701, the re-request processing 224 reads the requested information stored by the request processing 222 in the data storage unit 205 (in this case, the current traffic specification element) and the stored time (TXOP limit) and the excess or deficiency ratio in the time (TXOP limit) stored in the data storage unit 205 at the state 607 in the measurement processing 223. When the re-request processing 224 completes this reading, the re-request processing 224 then proceeds to a re-request-traffic-specification generating state 702. At the re-request-traffic-specification generating state 702, the traffic specification element for performing an appropriate bandwidth reservation is generated by using the read requested information, the read time (TXOP limit), and the read excess or deficiency ratio in the time (TXOP limit).

FIG. 8 illustrates a traffic specification element for re-request according to the first exemplary embodiment. In this element, the set value of Mean Data Rate is changed from that in FIG. 4.

As is obvious from the comparison with the element shown in FIG. 4, the element shown in FIG. 8 holds a value of 315 Kbps as Mean Data Rate, which is one half of 630 Kbps in FIG. 4. In other words, a value is described that is calculated by multiplying a value of Mean Data Rate in the request by the excess or deficiency ratio of the time (TXOP limit). As described above, the traffic specification element can be generated by using the new value for re-request in Mean Data Rate and using the same values in other parameters as those in the request.

When the generation of the traffic specification element for re-request is completed, the re-request processing 224 then proceeds to a traffic specification requesting state 703. At the traffic specification requesting state 703, addition of a traffic stream defined in the IEEE 802.11e standard (ADDTS) is performed on the QAP 101. At this state, the processing calls the traffic stream addition processing 235 in the wireless processing 221 and waits until the traffic stream addition processing 235 returns a result. In the traffic stream addition processing 235, a traffic-stream addition request frame to which a traffic specification element regarding expected traffic is attached is transmitted to the specified QAP 101 via the wireless unit 206. When a traffic-stream addition response frame is received from the QAP 101, the result is sent to the re-request processing 224.

If the addition of the traffic stream is accepted by the QAP 101, the re-request processing 224 proceeds to a requested information storing state 704. In contrast, if the addition of the traffic stream is rejected, the re-request processing 224 discontinues the processing. At the requested information storing state 704, the re-request processing 224 stores the traffic specification element (which is requested information that has been accepted) in the data storage unit 205. When the storing is completed, the re-request processing 224 ends.

Figure 9:
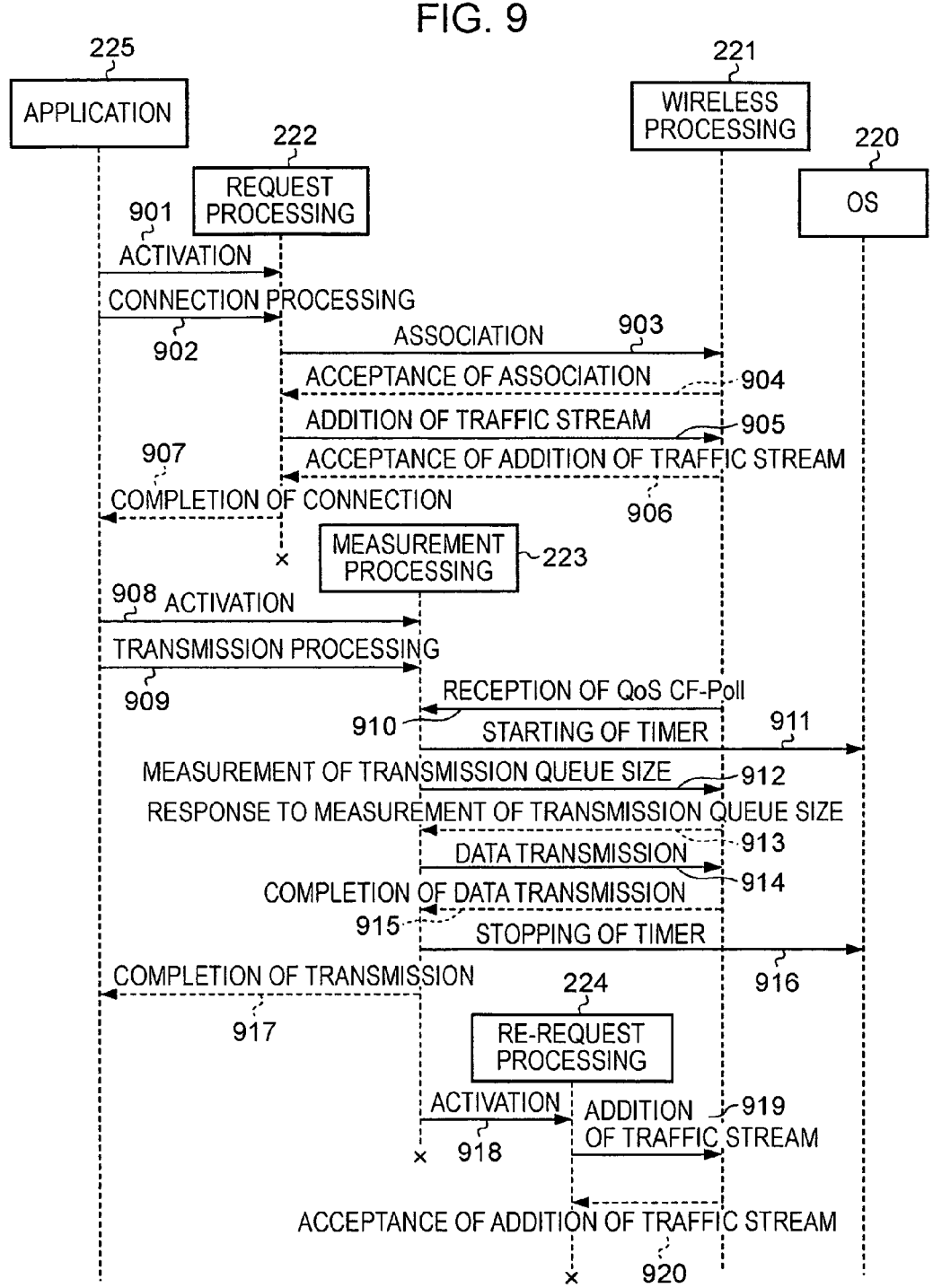
FIG. 9 is a sequence diagram illustrating message exchanges among request processing, measurement processing, re-request processing, an application that performs video streaming, wireless processing, and an operating system (OS) in a digital video camera according to the first exemplary embodiment.

FIG. 9 is a sequence diagram illustrating message exchanges among the request processing 222, measurement processing 223, re-request processing 224, application program 225, which deals with video streaming, wireless processing 221, and OS 220 in the digital video camera 100 according to the first exemplary embodiment. Here, a sequence is described that occurs when a bandwidth is in excess of that required for the actual traffic.

When the application program 225 receives an instruction to connect to the QAP 101 from the operation unit 203, the application program 225 activates the request processing 222 (arrow 901). Subsequently, the application program 225 sends to the request processing 222 a message that the connection processing is to be performed (902). Then, the request processing 222 sends to the wireless processing 221 a message that association processing is to be performed (903). If the association processing is accepted by the QAP 101, the wireless processing 221 sends to the request processing 222 a message that the association processing has been accepted (904). Subsequently, the request processing 222 sends to the wireless processing 221 a message that addition of a traffic stream is to be performed (905). If the addition of the traffic stream is accepted by the QAP 101, the wireless processing 221 sends to the request processing 222 a message that the addition of the traffic stream has been accepted (906). Subsequently, the request processing 222 notifies the application program 225 of the completion of the connection (907). Therefore, the request processing 222 ends.

When the application program 225 receives an instruction to transmit data from a user via an operation of the operation unit 203, the application program 225 activates the measurement processing 223 (arrow 908). The application program 225 sends to the measurement processing 223 a message that transmission processing is to be performed (909).

When the wireless processing 221 receives a QoS CF-Poll frame from the QAP 101, the wireless processing 221 notifies the measurement processing 223 of the reception of the QoS CF-Poll frame (910). The measurement processing 223 sends to the OS 220 a message to request time measurement by using a timer (911). Additionally, the measurement processing 223 sends to the wireless processing 221 a message that the size of the transmission queue is to be measured (912). As a response to this message, the wireless processing 221 sends to the measurement processing 223 a transmission-queue-size measurement response message that indicates the size of the current transmission queue (913). Subsequently, the measurement processing 223 sends to the wireless processing 221 a message that data transmission is to be performed (914). When the data transmission is completed, the wireless processing 221 then notifies the measurement processing 223 of the completion of the data transmission (915). Subsequently, the measurement processing 223 sends to the OS 220 a message to request stopping the time measurement in the timer (916). Additionally, the measurement processing 223 sends to the application program 225 a message that the transmission has been completed (917). Subsequently, the measurement processing 223 activates the re-request processing 224 and ends (918).

The activated re-request processing 224 sends to the wireless processing 221 a message that addition of a traffic stream is to be performed (919). When the addition of the traffic stream is accepted by the QAP 101, the wireless processing 221 sends to the re-request processing 224 a message that the addition of the traffic stream has been accepted (920). The re-request processing 224 ends.

Figure 10:
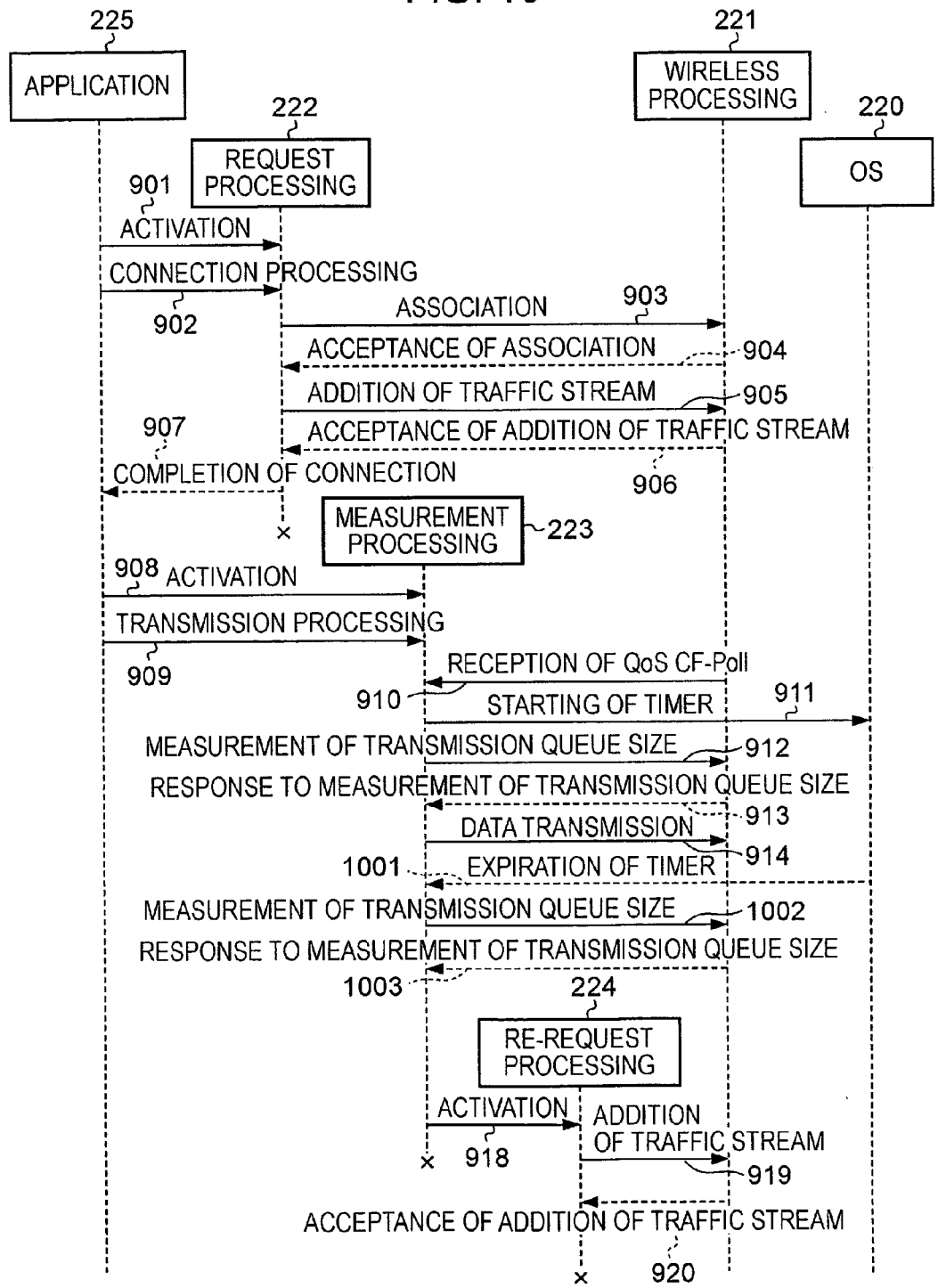
FIG. 10 is a sequence diagram similar to FIG. 9, but shows a case in which a bandwidth is insufficient for the actual traffic.

FIG. 10 is a sequence diagram illustrating message exchanges among the request processing 222, measurement processing 223, re-request processing 224, application program 225, which deals with video streaming, wireless processing 221, and OS 220 in the digital video camera 100. Here, a sequence is described that occurs when a bandwidth is deficient. In FIG. 10, the same reference numerals are used as in FIG. 9 for the same parts, and the explanation thereof is omitted.

Processing from the activation of the request processing 222 performed by the application program 225 (arrow 901) to the transmission of the massage that the data transmission is to be performed from the measurement processing 223 to the wireless processing 221 (arrow 914) is the same as that in FIG. 9.

When the time measured by the timer (time ((TXOP limit)×TU) has elapsed, the OS 220 notifies the measurement processing 223 of the expiration of the time measurement in the timer (1001). The measurement processing 223 sends to the wireless processing 221 a message that the size of the transmission queue is to be measured (1002). As a response to this message, the wireless processing 221 sends to the measurement processing 223 a transmission-queue-size measurement response message that indicates the size of the current transmission queue (1003). Subsequently, the measurement processing 223 activates the re-request processing 224 and ends (918).

The activated re-request processing 224 sends to the wireless processing 221 a message that addition of a traffic stream is to be performed (919). When the addition of the traffic stream is accepted by the QAP 101, the wireless processing 221 sends to the re-request processing 224 a message that the addition of the traffic stream has been accepted (920). The re-request processing 224 ends.

The first exemplary embodiment is described above. In this exemplary embodiment, a wireless terminal is described that performs wireless communication by using the wireless method in accordance with the IEEE 802.11a standard as the physical layer and the IEEE 802.11 and 802.11e standards as the MAC layer. However, the wireless terminal is not limited to this method. The wireless terminal may use any similar but different wireless method.

For the request processing 222, measurement processing 223, stored data, and re-request processing 224, division of processing, timing, stored information are not limited to the description above. The details of processing may vary as long as the features in this exemplary embodiment are realized.

In the first exemplary embodiment, request corresponding to expected traffic is performed, and data is transmitted and received on the basis of requested information that has been accepted. Additionally, the actual traffic is measured, and re-request for performing an appropriate bandwidth reservation corresponding to the measured traffic is performed. For example, by using the history of the requested information elements obtained by repetitions of the processing shown in the first exemplary embodiment, re-request may be performed more accurately.

Moreover, in, for example, the measurement processing 223, traffic may be measured on the basis of the number of retransmissions, instead of the time (TXOP limit) or the size of the transmission queue.

Furthermore, in the case that re-request corresponding to a bandwidth that is more than (or less than) a predetermined amount has been performed by the re-request processing 224 and the re-request has been accepted already, no further re-request corresponding to a bandwidth more than (or less than) this amount may be performed. This processing prevents a reserved bandwidth from being significantly increased (or reduced). Information regarding this processing may be added to the measurement processing 223, re-request processing 224, or any other processing.

Second Exemplary Embodiment

The second exemplary embodiment is described next. In the second exemplary embodiment, the digital video camera (QSTA) 100 and access point (QAP) 101, as in the first exemplary embodiment (FIGS. 1 to 3B), is used. The QSTA 100 and QAP 101 can perform wireless communication in accordance with the IEEE 802.11a standard as the physical layer. In addition, the QSTA 100 and QAP 101 can perform wireless communication (including the optional HCCA) in accordance with the IEEE 802.11 and 802.11e standards as the MAC layer.

When the request processing 222 in the digital video camera 100 is activated, as is previously described with reference to FIG. 3A, the request processing 222 proceeds to the association state 301, calls the association processing 233 in the wireless processing 221, and waits until the association processing 233 responds. At the association processing 233, an association request frame is transmitted to the specified QAP 101 via the wireless unit 206. When an association response frame is received from the QAP 101, the result is returned to the request processing 222.

If the association is accepted by the QAP 101, the acceptance of the association is returned to the request processing 222, and the request processing 222 proceeds to the traffic specification generating state 302. In contrast, if the association is rejected by the QAP 101, the rejection of the association is returned to the request processing 222. The request processing 222 notifies the data storage unit 205 of the rejection of the association and discontinues the processing.

At the traffic specification generating state 302, the request processing 222 generates a traffic specification element corresponding to traffic expected in video streaming in the digital video camera 100 performed by the application program 225.

In the second exemplary embodiment, a traffic specification element that has been previously stored in the program storage unit 204, as shown in FIG. 11, is read, and, the traffic specification element to be used at the next state is prepared.

FIG. 11 illustrates an example of a default traffic specification element according to the second exemplary embodiment. The traffic specification element shown in FIG. 11 is different from that in FIG. 4 for the first exemplary embodiment in that a value of Access Policy is changed to EDCA. EDCA is of the distributed control type, like the conventional DCF, but is enhanced so as to be able to perform prioritization with respect to access to a wireless medium depending on the type of data.

When the generation of the traffic specification element is completed, the request processing 222 then proceeds to the traffic specification element requesting state 303. At the traffic specification element requesting state 303, addition of a traffic stream defined in the IEEE 802.11e standard (ADDTS) is performed on the QAP 101 specified by the application program 225. At this state, the processing calls the traffic stream addition processing 235 in the wireless processing 221 and waits until the traffic stream addition processing 235 returns a result. In the traffic stream addition processing 235, a traffic-stream addition request frame to which the traffic specification element regarding expected traffic is attached is transmitted to the QAP 101 specified by the application program 225 via the wireless unit 206. When a traffic-stream addition response frame is received from the QAP 101, the result is returned to the request processing 222.

If the addition of the traffic stream is accepted by the QAP 101, the request processing 222 proceeds to the requested information storing state 304. In contrast, if the addition of the traffic stream is rejected, the request processing 222 notifies the application program 225 of the rejection of the request of the traffic specification and discontinues the processing. In the requested information storing state 304, the traffic specification element (which is requested information that has been accepted) is stored in the data storage unit 205. When this storing is completed, the request processing 222 ends.

The QAP 101, which has accepted the request of the traffic specification from the QSTA 100, sets Contention Window (CW) parameters (CWmin and CWmax), the time (TXOP limit) for each access category (priority) required for EDCA control in the second exemplary embodiment.

Figure 12:
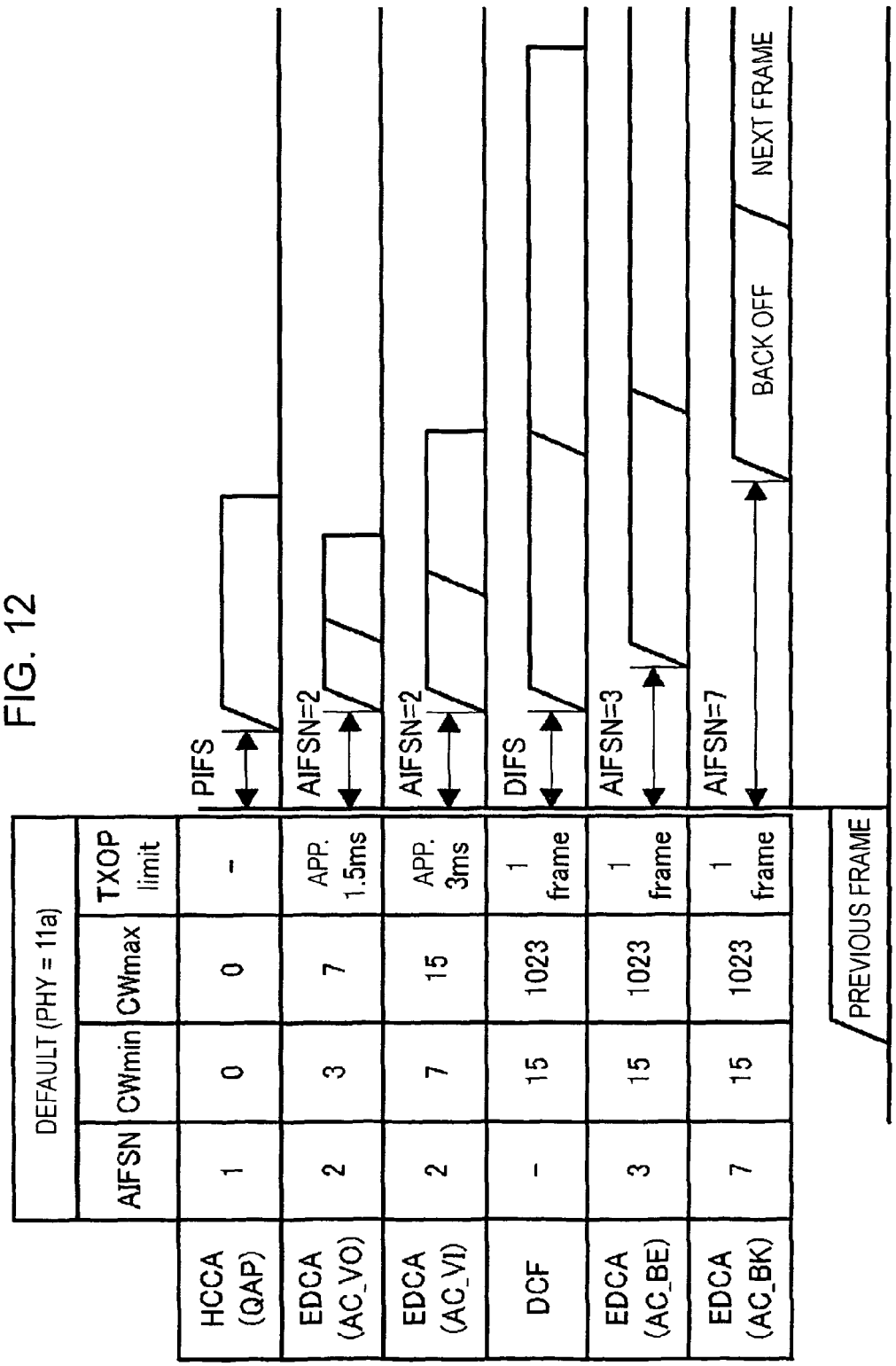
FIG. 12 illustrates default settings and media access performed by CSMA/CA according to the second exemplary embodiment.

FIG. 12 illustrates default settings and media access performed by CSMA/CA according to the second exemplary embodiment.

The digital video camera 100 which is trying to transmit data checks an Arbitrary Inter Frame Space Number (AIFSN) time and whether a medium is idle on the basis of the access category of transmitted data. Additionally, the digital video camera 100 checks a random time derived from CWmin and CWmax and whether the medium is idle (the medium may be changed to be busy on its way to the destination), and transmits the maximum time (TXOP limit) data.

Figures 13A, 13B:
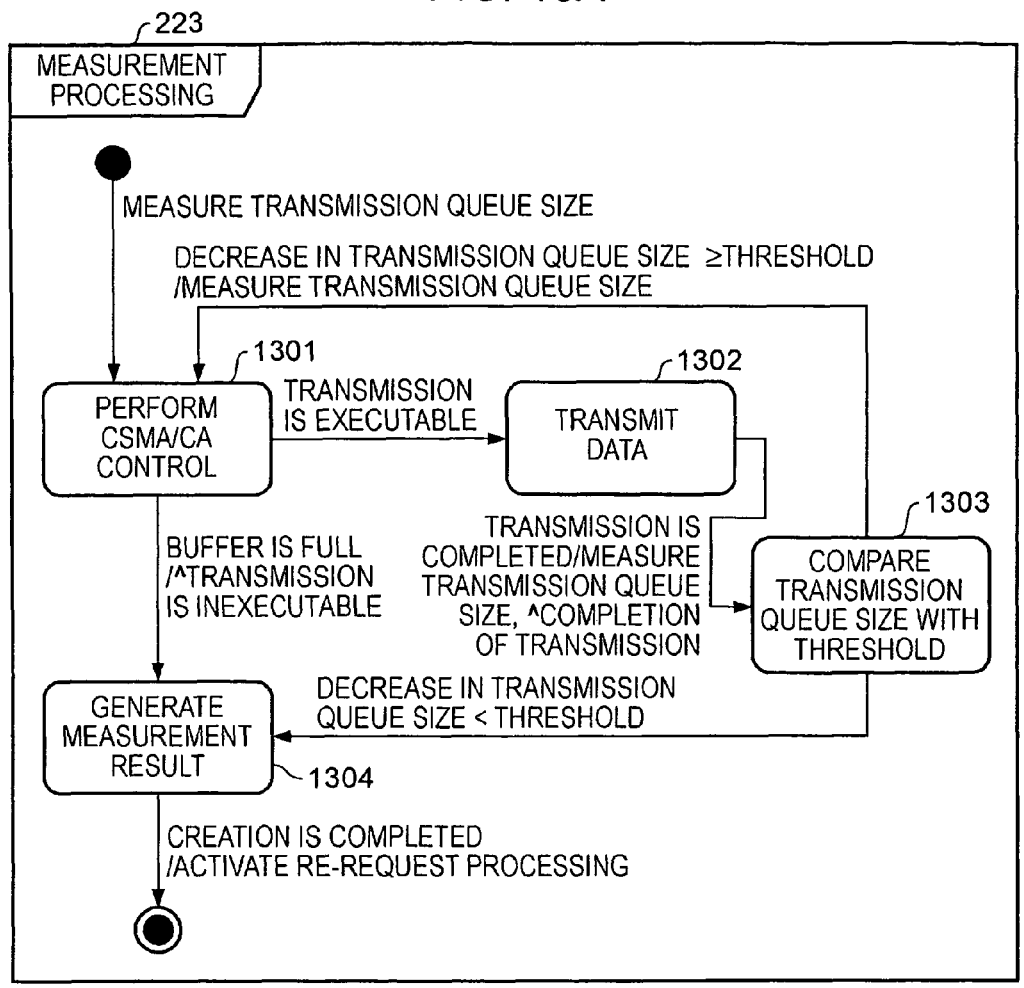
FIG. 13A illustrates a state machine diagram of measurement processing according to the second exemplary embodiment.
FIG. 13B illustrates a result of measurement.

FIG. 13A illustrates a state machine diagram of the measurement processing 223 according to the second exemplary embodiment. FIG. 13B illustrates a result of measurement.

The measurement processing 223 shown in FIG. 13A operates in the digital video camera 100. The measurement processing 223 performs measurement processing to check whether the access category determined from the requested traffic specification allows smooth media access or whether the time (TXOP limit) corresponding to the access category is in excess of or insufficient for that required for the actual traffic. When the data transmission processing of the application program 225 which deals with the video streaming in the digital video camera 100 is activated, the measurement processing 223 is activated by the application program 225.

When activated, the measurement processing 223 measures the size of a first transmission queue that is the queue before data is transmitted, and proceeds to a CSMA/CA control state 1301. At the CSMA/CA control state 1301, the media access processing previously described with reference to FIG. 12 is performed. When, at the CSMA/CA control state 1301, the measurement processing 223 determines that the transmission is executable, the measurement processing 223 proceeds to a data transmitting state 1302. The CSMA/CA control state 1301, data transmitting state 1302, and the transition between these two states are performed in the wireless unit 206, and are not sensed by the measurement processing 223 (i.e., the processing shifts within the wireless unit 206).

At the data transmitting state 1302, the data transmission is performed within the wireless unit 206 such that the time (TXOP limit) corresponding to the requested access category is set as the maximum time. If the transmission is completed and the notification of the completion of the data transmission is received via the wireless processing 221, the measurement processing 223 measures the size of a second transmission queue that is the queue after the data is transmitted and then proceeds to a transmission-queue-size comparing state 1303. At the transmission-queue-size comparing state 1303, it is determined whether a decrease between the size of the first transmission queue and that of the second transmission queue is smaller than a threshold. If the decrease is smaller than the threshold, the measurement processing 223 proceeds to a measurement result generating state 1304. For example, if threshold is 50, when the size of the first transmission queue is 100 and the size of the second transmission queue is 80, the measurement processing 223 proceeds to the measurement result generating state 1304.

In contrast, if the decrease in the transmission queue size is equal to or larger than the threshold, the measurement processing 223 measures the size of the first transmission queue (which is the queue before the data is transmitted) and then returns to the CSMA/CA control state 1301. At the CSMA/CA control state 1301, when the transmission queue is full, the measurement processing 223 is notified that the buffer is full via the wireless processing 221 and then proceeds to measurement result generating state 1304.

If the transmission queue is full and the processing moves from the CSMA/CA control state 1301 to the measurement result generating state 1304, the measurement processing 223 generates a measurement result indicating that the buffer is full (as shown in (1) in FIG. 13B). In contrast, if the processing moves from the transmission-queue-size comparing state 1303 to the measurement result generating state 1304 and the decrease in the transmission queue size is positive, the measurement processing 223 generates a result indicating that the decrease in the transmission queue size is poor (as shown in (3) in FIG. 13B). If the processing moves from the transmission-queue-size comparing state 1303 to the measurement result generating state 1304 and the decrease in the transmission queue size is negative, the measurement processing 223 generates a result indicating that the size of the transmission queue is increased (as shown in (2) in FIG. 13B). When the generation of the measurement result is completed, the measurement processing 223 activates the re-request processing 224 and ends.

Figure 14:
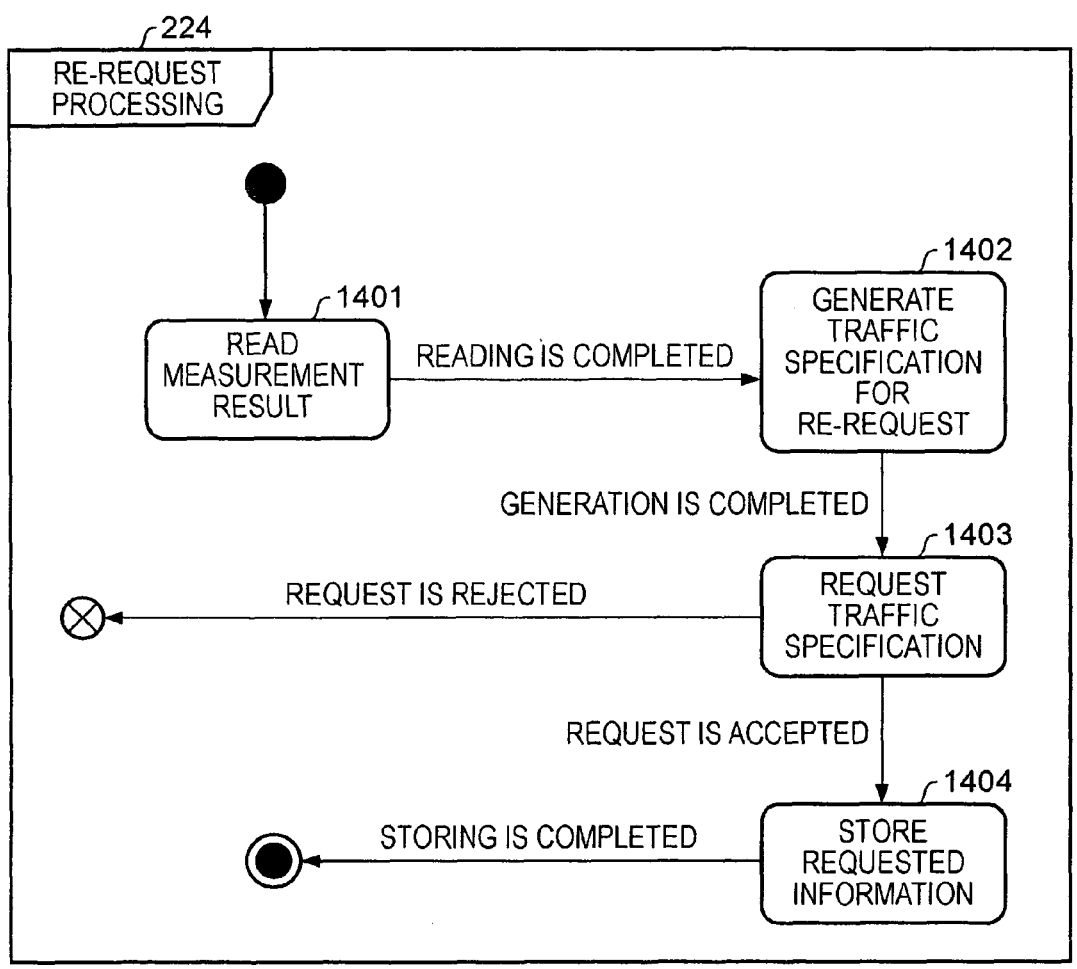
FIG. 14 illustrates a state machine diagram of re-request processing according to the second exemplary embodiment.

FIG. 14 illustrates a state machine diagram of the re-request processing 224 according to the second exemplary embodiment. The re-request processing 224 operates in the digital video camera 100 and requests information regarding the actual traffic. The re-request processing 224 is activated by the measurement processing 223 described above.

When activated, the re-request processing 224 proceeds to a measurement result reading state 1401. At the measurement result reading state 1401, the re-request processing 224 reads the information stored by the request processing 222 described above (in this case, the current traffic specification element) and the measurement result generated by the measurement processing 223 described above. When the reading is completed, the re-request processing 224 then proceeds to a re-request-traffic-specification generating state 1402. At the re-request-traffic-specification generating state 1402, the re-request processing 224 generates a traffic specification element for assigning an appropriate priority by using the read requested information and measurement result.

If, as shown in FIG. 15, the measurement result is that the transmission queue is full, the access category (Use Priority) in the information is changed to a value that is one level higher so as to have a new access category for re-request. In this case, the traffic specification element for re-request is generated by using the same values in other parameters as those in the previous request.

FIG. 15 illustrates an example of the traffic specification element for re-request according to the second exemplary embodiment. Compared with the element shown in FIG. 11, the element in FIG. 15 holds six as User Priority, which is changed from five in FIG. 11.

When the generation of the traffic specification is completed, the re-request processing 224 then proceeds to a traffic specification requesting state 1403. At traffic specification requesting state 1403, addition of a traffic stream defined in the IEEE 802.11e standard (ADDTS) is performed on the QAP 101. At this state, the processing calls the traffic stream addition processing 235 in the wireless processing 221 and waits until the traffic stream addition processing 235 returns a result. In the traffic stream addition processing 235, a traffic-stream addition request frame to which a traffic specification element regarding expected traffic is attached is transmitted to the specified QAP 101 via the wireless unit 206. When a traffic-stream addition response frame is received from the QAP 101, the result is sent to the re-request processing 224.

If the addition of the traffic stream is accepted by the QAP 101, the re-request processing 224 proceeds to a requested information storing state 1404. If the addition of the traffic stream is rejected, the re-request processing 224 discontinues the processing. At the requested information storing state 1404, the re-request processing 224 stores the traffic specification element (which is requested information that has been accepted) in the data storage unit 205. When this storing is completed, the re-request processing 224 ends.

Figure 16:
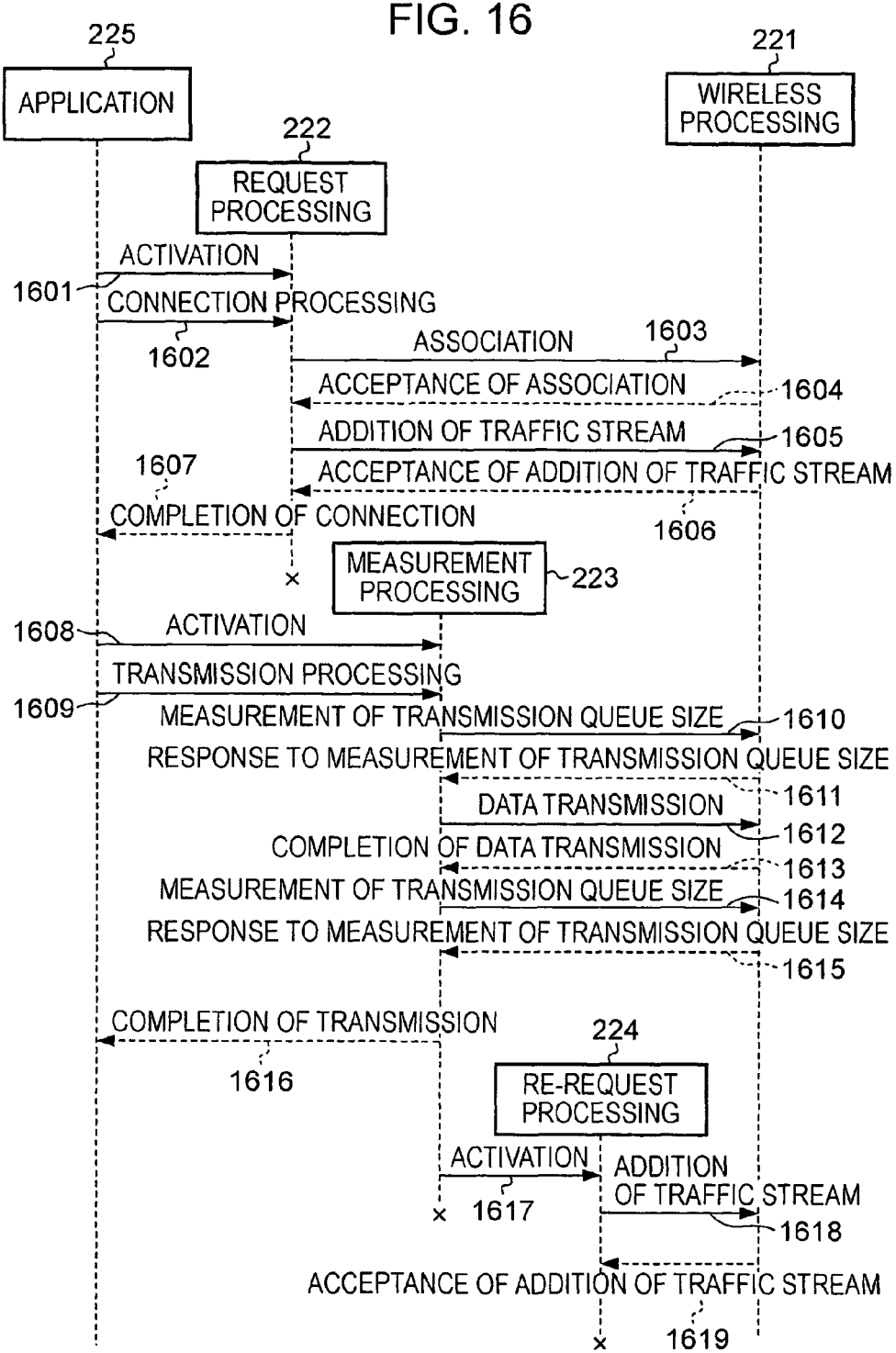
FIG. 16 is a sequence diagram illustrating message exchanges among request processing, measurement processing, re-request processing, an application that performs video streaming, and wireless processing according to the second exemplary embodiment.

FIG. 16 is a sequence diagram illustrating message exchanges among the request processing 222, measurement processing 223, re-request processing 224, application program 225, which deals with video streaming, and wireless processing 221 according to the second exemplary embodiment. Here, a sequence is described that occurs when the size of the transmission queue is increased or when the decrease in the transmission queue size is poor because the priority is low.

When the application program 225 receives an instruction to connect to the QAP 101 from the operation unit 203, the application program 225 activates the request processing 222 (arrow 1601). Subsequently, the application program 225 notifies the request processing 222 that the connection processing is to be performed (1602). The request processing 222 sends to the wireless processing 221 a message that association processing is to be performed (1603). If the association processing is accepted by the QAP 101, the wireless processing 221 sends to the request processing 222 a message that the association processing has been accepted (1604). Subsequently, the request processing 222 sends to the wireless processing 221 a message that addition of a traffic stream is to be performed (1605). If the addition of the traffic stream is accepted by the QAP 101, the wireless processing 221 sends to the request processing 222 a message that the addition of the traffic stream has been accepted (1606). Subsequently, the request processing 222 notifies the application program 225 of the completion of the connection (1607). The request processing 222 ends.

When the application program 225 receives an instruction to transmit data from the operation unit 203, the application program 225 activates the measurement processing 223 (arrow 1608). The application program 225 sends to the measurement processing 223 a message that transmission processing is to be performed (1609). Subsequently, the measurement processing 223 sends to the wireless processing 221 a message that the size of the transmission queue is to be measured (1610). As a response to this message, the wireless processing 221 sends to the measurement processing 223 a transmission-queue-size measurement response message that indicates the size of the current transmission queue (1611). Subsequently, the measurement processing 223 sends to the wireless processing 221 a message that data transmission is to be performed (1612). When the data transmission is completed, the wireless processing 221 then notifies the measurement processing 223 of the completion of the data transmission (1613). Subsequently, the measurement processing 223 sends to the wireless processing 221 a message that the size of the transmission queue is to be measured (1614). As a response to this message, the wireless processing 221 sends to the measurement processing 223 a transmission-queue-size measurement response message that indicates the size of the current transmission queue (1615). Subsequently, the measurement processing 223 sends to the application program 225 a message of the completion of the transmission (1616).

The measurement processing 223 activates the re-request processing 224 and ends (1617). The activated re-request processing 224 sends to the wireless processing 221 a message that addition of a traffic stream is to be performed (1618). If the addition of the traffic stream is accepted by the QAP 101, the wireless processing 221 sends to the re-request processing 224 a message that the addition of the traffic stream has been accepted (1619). The re-request processing 224 ends.

Figure 17:
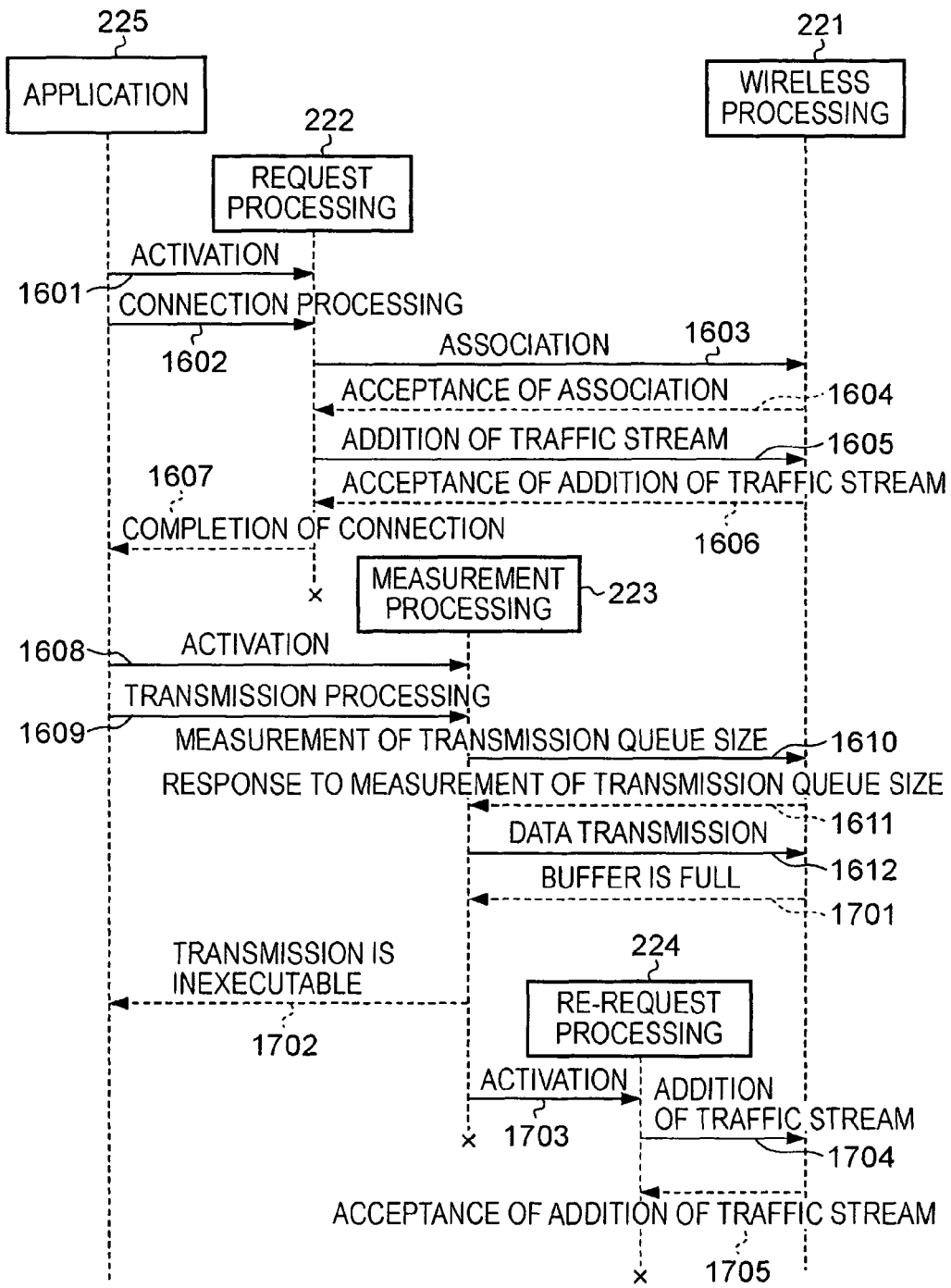
FIG. 17 is a sequence diagram similar to FIG. 16, but shows a case in which the priority is low (transmission queue is full).

FIG. 17 is a sequence diagram illustrating message exchanges among the request processing 222, measurement processing 223, re-request processing 224, application program 225, which deals with video streaming, and wireless processing 221 according to the second exemplary embodiment. Here, a sequence is described that occurs when the transmission queue is full because the priority is low. In FIG. 17, the same reference numerals are used as in FIG. 16 for the same parts, and the explanation thereof is omitted.

Processing from the activation of the request processing 222 performed by the application program 225 (arrow 1601) to the transmission of the massage that the data transmission is to be performed from the measurement processing 223 to the wireless processing 221 (1612) is the same as that in FIG. 16.

Subsequently, if the transmission queue is full, the wireless processing 221 notifies the measurement processing 223 that the buffer is full (1701). Subsequently, the measurement processing 223 sends to the application program 225 a message that the transmission is inexecutable (1702). Subsequently, the measurement processing 223 activates the re-request processing 224 (1703) and ends. The activated re-request processing 224 sends to the wireless processing 221 a message that addition of a traffic stream is to be performed (1704). If the addition of the traffic stream is accepted by the QAP 101, the wireless processing 221 sends to the re-request processing 224 a message that the addition of the traffic stream has been accepted (1705). The re-request processing 224 ends.

The second exemplary embodiment is described above. In this exemplary embodiment, a wireless terminal is described that performs wireless communication by using the wireless method in accordance with the IEEE 802.11a standard as the physical layer and the IEEE 802.11 and 802.11e standards as the MAC layer. However, the wireless terminal is not limited to this method. The wireless terminal may use any similar but different wireless method.

For the request processing 222, measurement processing 223, the measurement result, and re-request processing 224, division of processing, timing, the content of the result are not limited to the description above. The details of processing may vary as long as the features in this exemplary embodiment are realized.

In the second exemplary embodiment, request corresponding to expected traffic is performed, and data is transmitted and received on the basis of requested information that has been accepted. Additionally, the actual traffic is measured, and re-request for assigning an appropriate priority corresponding to the measured traffic is performed.

For example, by using the history of the requested information elements obtained by repetitions of the processing shown in the second exemplary embodiment, re-request may be performed more accurately. In the re-request processing 224, EDCA may be switched to HCCA. Furthermore, in the case where re-request corresponding to a priority that is more than (or less than) a predetermined value has been performed by the re-request processing 224 and the re-request has been accepted already, no further re-request corresponding to a priority more than (or less than) this value may be performed. This processing prevents the level of a priority from being significantly increased (or reduced). This processing may be added to the measurement processing, re-request processing, or any other processing.

Regarding the best mode for carrying out the invention, the two exemplary embodiments are described above. Any combination of the elements in these exemplary embodiments can constitute a new exemplary embodiment.

The present invention can also be achieved by supplying a storage medium (or a recoding medium) storing software program code that achieves the functions of the above-described embodiments to a system or an apparatus and by causing a computer (central processing unit (CPU) or microprocessing unit (MPU)) of the system or apparatus to read and execute the software program code.

In such a case, the program code itself read out of the storage medium realizes the functions of the above-described embodiments. Therefore, the storage medium storing the program code can also realize the present invention.

Examples of a storage medium (recording medium) for supplying program code include, but are not limited thereto, a flexible disk, a hard disk, a magneto-optical disk (MO), a compact disk read-only memory (CD-ROM), a CD recordable (CD-R), a CD-Rewritable (CD-RW), a digital versatile disk-ROM (DVD-ROM), a DVD-RAM, a DVD-R, DVD+R, DVD-RW, DVD+RW, HD-DVD, Blu-ray Disc, magnetic tape, a nonvolatile memory card, a ROM, and the like. Further, the program code may be downloaded via a network.

The functions of the above-described embodiments can be realized by another method in addition to executing the program code read out by the computer. For example, the functions of the above-described embodiments can be realized by a process in which an OS running on the computer executes some of or all of the functions in the above-described embodiments under the control of the program code.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

According to an exemplary embodiment, wireless data transmission that corresponds to traffic can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-171661 filed Jun. 10, 2005, which is hereby incorporated by reference herein in its entirety.

What is claimed is:

1. A wireless communication apparatus comprising:
a generation unit configured to generate traffic information corresponding to an application program for data communication, the traffic information including a data rate;
a request unit configured to request an access point to perform an addition of a traffic stream, using the traffic information generated by the generation unit;
a communication unit configured to perform data communication wirelessly based on the addition of the traffic stream;
a measurement unit configured to measure data amount of the traffic stream actually transmitted to the access point by the communication unit;
a calculation unit configured to calculate an excess ratio of an allocated communication bandwidth to a calculated communication bandwidth on basis of the data amount measured by the measurement unit, and a predetermined data amount to be transmitted;
a changing unit configured to reduce the data rate included in the traffic information based on the excess ratio; and
a re-request unit configured to re-request the access point to reserve a communication bandwidth using the reduced data rate.

2. The wireless communication apparatus according to claim 1, wherein the traffic stream is defined according to the IEEE 802.11e standard.

3. The wireless communication apparatus according to claim 1, wherein the traffic information includes at least Minimum PHY Rate.

4. The wireless communication apparatus according to claim 1, wherein the calculation unit includes:
a time measurement subunit configured to measure time spent on transmitting the predetermined amount of data; and
a comparison subunit configured to compare a communication time set by the access point for reserving the communication bandwidth with the time measured by the time measurement subunit, and
wherein the excess ratio is calculated according to a difference between the reserved communication bandwidth and the measured time.

5. A method for controlling a wireless communication apparatus, the method comprising:
generating traffic information corresponding to an application program for data communication, the traffic information including a data rate;
requesting an access point to perform an addition of a traffic stream, using the traffic information;
performing data communication wirelessly based on the addition of the traffic stream;
measuring data amount of the traffic stream actually transmitted to the access point;
calculating an excess ratio of an allocated communication bandwidth to a calculated communication bandwidth for the traffic stream on basis of the data amount measured and a predetermined data amount to be transmitted;
reducing the data rate included in the traffic information based on the excess ratio; and
re-requesting the access point to reserve a communication bandwidth using the reduced data rate.

6. The method according to claim 5, wherein the traffic stream is defined according to the IEEE 802.11e standard.

7. The method according to claim 5, wherein the traffic information includes at least Minimum PHY Rate.

8. The method according to claim 5, wherein calculating traffic during the data communication comprises:
measuring time spent on transmitting the predetermined amount of data; and
comparing a communication time set by the access point for reserving the communication bandwidth with the time measured, and
wherein the excess ratio is calculated according to a difference between the reserved communication time and the measured time.

9. A non-transitory machine-readable medium having stored thereon instructions which, when executed by a wireless communication apparatus, causes the wireless communication apparatus to perform operations comprising:
generating traffic information corresponding to an application program for data communication, the traffic information including a data rate;
re-requesting the access point to reserve a communication bandwidth using the reduced data rate.

10. The machine-readable medium according to claim 9, wherein the traffic stream is defined according to the IEEE 802.11e standard.

11. The machine-readable medium according to claim 9, wherein the traffic information includes at least Minimum PHY Rate.

12. The machine-readable medium according to claim 9, wherein calculating traffic during the data communication comprises:
measuring time spent on transmitting the predetermined amount of data; and
comparing a communication time set by the access point for reserving the communication bandwidth with the time measured, and
wherein the excess ratio is calculated according to a difference between the reserved communication time and the measured time.

13. The wireless communication apparatus according to claim 1, wherein the changing unit sets a value calculated by multiplying the data rate included in the traffic information by the excess ratio calculated by the calculation unit as a new data rate, and changes the traffic information in which other parameters are not changed.

14. The wireless communication apparatus according to claim 1, further comprising:
a storage unit configured to repeat communication by the communication unit, calculation by the calculation unit, change by the changing unit and re-request by the re-request unit and to store history of requested traffic information,
wherein values of the parameters to be changed by the changing unit are determined based on the history stored by the storage unit.

15. The wireless communication apparatus according to claim 1, wherein the re-request unit does not re-request for reservation when communication time set by the access point for reserving the communication bandwidth is longer or shorter than the already reserved predetermined time.

16. The wireless communication apparatus according to claim 1, wherein the calculating unit calculates excess and deficiency of a communication bandwidth to the communication bandwidth reserved by the access point on the basis of the data amount measured by the measurement unit, and the predetermined data amount to be transmitted by the wireless communication apparatus.

\* \* \* \* \*